United States Patent [19]

Munroe

[11] 4,063,299
[45] Dec. 13, 1977

[54] MAGNETICALLY LATCHED GROUND FAULT CIRCUIT INTERRUPTER

[75] Inventor: Ronald G. Munroe, Dolgeville, N.Y.

[73] Assignee: Eagle Electric Mfg. Co. Inc., Long Island City, N.Y.

[21] Appl. No.: 625,645

[22] Filed: Oct. 24, 1975

[51] Int. Cl.² .............................................. H02H 3/28
[52] U.S. Cl. ...................................... 361/45; 361/114; 361/155
[58] Field of Search ................ 317/18 D, 18 A, 27 R, 317/22, 33 SC, 33 C; 361/45, 49, 114, 155

[56] References Cited

U.S. PATENT DOCUMENTS

| | | | |
|---|---|---|---|
| 3,376,477 | 4/1968 | Weinger | 317/18 D X |
| 3,617,808 | 11/1971 | Yoder | 317/18 D |
| 3,683,239 | 8/1972 | Sturman | 317/154 X |
| 3,721,862 | 3/1973 | Brennen et al. | 317/154 X |
| 3,761,774 | 9/1973 | Laughinghouse et al. | 317/18 D X |
| 3,769,548 | 10/1973 | Pardue | 317/18 D |
| 3,840,783 | 10/1974 | Eckart | 317/18 D |

*Primary Examiner*—J D Miller
*Assistant Examiner*—Patrick R. Salce

*Attorney, Agent, or Firm*—Kirschstein, Kirschstein, Ottinger & Frank

[57] ABSTRACT

A ground fault circuit interrupter (GFI) in which a load circuit is energized through a normally closed magnetically latchable circuit breaker. When no fault exists that is of sufficient magnitude to actuate the GFI, the latching coil of the circuit breaker is ineffective, whereby the circuit breaker remains closed. The coil is connected to the amplified DC output of a ground fault sensing circuit and is energized in a certain sense to open the circuit breaker upon the occurrence of a fault, the circuit breaker then being magnetically latched open. A capacitor is continuously DC charged in a certain sense by the AC supply line through a rectifier. To reset the circuit breaker the capacitor is selectively connected across the coil to discharge a pulse of a sufficient magnitude in a proper sense to reversely energize the coil enough to release the magnetic latch and allow the circuit breaker to reclose. The GFI is tested by closing a circuit that simulates a fault of the low magnitude which is to be sensed. Where additional circuits are protected by the same GFI they may be provided with resetting and testing equipment that are slaved to the GFI.

16 Claims, 4 Drawing Figures

MAGNETICALLY LATCHED GROUND FAULT CIRCUIT INTERRUPTER

BACKGROUND OF THE INVENTION

1. Field of the Invention

A GFI having a normally closed power switch that upon the occurrence of a fault is opened and magnetically latched open, being resettable by discharge of a charged condenser across a magnetic unlatching coil.

2. Description of the Prior Art

The purpose of a GFI is to protect people from an electric shock that could cause injury or even death. Usually an electric shock is caused by a breakdown in a tool or appliance of insulation between an electrically live element and a conductive housing that is in contact with a person using the tool or appliance. In a three-wire circuit, i.e. one having a hot line, a neutral line and a grounding conductor, such a breakdown in insulation should enable the fault current to flow back to the source through the grounding conductor, thus eliminating the potential hazard. In practice, however, the grounding path may not be efficient, due to poor contacts, terminations and other factors that give rise to resistance in the grounding path. The only protection normally provided in a circuit is a fuse or circuit breaker both of which require an excess of the full rated current of the circuit to activate the protective device in order to de-energize the circuit. For example, in a 15 amp. circuit, 20½ amps. are necessary for the circuit breaker or fuse to open. Indeed, Underwriters' Laboratories (U.L.) allots one hour for the protective device to open the circuit at this current.

It has been established that less than 0.1 amps. at 110 volts AC may engender fibrillation of the heart followed by death. Quite apparently, fuses and circuit breakers are designed to protect tools, appliances and supply wiring and afford absolutely no protection against these very small fault currents that may occur because of an insulation breakdown and the touching by a person of a part of a tool or appliance that should be electrically dead but is not. It also is apparent that in a two-wire circuit emplying two-wire plugs and in which there is no grounding conductor there is absolutely no protection to a person due to a ground fault.

GFI's are designed to sense a fault current, that is to say, a current from a live wire to ground which does not flow through the return line, which fault current is of a very low order of magnitude such as to be non-harmful to a person. A fault current that will actuate a GFI to open a circuit is as little as 5 milliamperes over a very short span of time. Preferably, this time is as little as one and one-half cycles of a conventional 60 cycle per second AC power supply, i.e. as little as 1/40th of a second. Such protection is suitable to eliminate the possibility of serious electric shock injury and death.

GFI's are presently commercially available. Their general nature is outlined in an article entitled "Barring Serious Shocks with Ground Fault Interrupter" by Jerome Frank at pages 17-23 of the May 1973 issue of PLANT OPERATING MANAGEMENT. The basic principle of operation of a GFI is simple and well known. Any current from a load, e.g. a live appliance, tool or fixture, that passes through the human body to ground would not return via its normal path to the neutral grounded conductor. A GFI employs a differential transformer, normally of the toroidal construction, where the hot (live) and neutral conductors pass through the transformer. Should the current going to the load return through the neutral conductor in the normal manner, the two currents cancel each other out and no voltage is induced in the differential transformer. However, if a fault exists and current flows through a person to ground, this current does not return to ground through the differential transformer and the resulting imbalance or difference in current is sensed by the transformer. This induced voltage now is amplified to provide enough energy to trigger a solid state switching device, usually a silicon control rectifier (SCR). The SCR which now has been turned on by the amplified signal from the transformer supplies power, usually to a solenoid type device. The energized solenoid trips a mechanism to open the circuit. All this must take place in 1/40th of a second or faster.

U.L. requires that a GFI device incorporate a test button and a means of resetting the device should it trip out due to a fault. Usually, the test button connects a resistance which would create a 5-milliampere fault current from the hot line after the differential transformer to the neutral return line before the transformer, thus simulating a fault current. U.L. further requires that the device be trip-free. This means that should a person hold the reset button in activated position, the GFI device still must trip free should a fault current exist. This also means that the trip mechanism must be able to operate mechanically independent of the linkage employed by the reset mechanism. This same requirement exits for circuit breakers and it is because of this that GFI's presently on the market employ a mechanical circuit breaker type mechanism. Due to the fast acting time required by U.L., the initiating solenoid which releases the mechanical parts to open up the circuit must be very sensitive and tolerances on all moving parts become rather critical. With the passage of time, circuit breaker mechanisms lose their consistency and the operating characteristics are adversely affected. Parts wear, lubrication areas dry out, corrosion may occur between unlike materials in mechanical linkages, and other factors will cause changes in the operating characteristics in the GFI.

The GFI may become too sensitive and trip out because of wear or vibration. A far more serious weakness exists when the parts do not move freely enough and the GFI may not activate fast enough or not activate at all when a dangerous fault current exists. This is another reason why U.L. requires that each GFI be supplied with a chart to be mounted near the device where periodic tests are performed and recorded on this chart at least once a month to denote that the GFI is operating properly.

Present GFI devices on the market come in three basic forms.

The first is a standard type circuit breaker with a GFI circuitry built in. These circuit breakers have a supplementary solenoid to trip the mechanism which is operated by the GFI circuit. They are so designed that they would also trip out due to normal overload of current.

The second is a portable plug-in device which incorporates usually a GFI circuit breaker and a convenience outlet where portable tools or appliances can be plugged in.

The third is a standard type duplex wall receptacle with the GFI circuitry and interrupting mechanism built right in. The receptacle is normally installed as the first outlet after the circuit breaker or fuse in a branch circuit. If the device is of the feed-through type, other receptacles in the circuit beyond the GFI device are protected. Should a receptacle in the circuit become de-energized because the GFI tripped out, it then becomes necessary for the person using the tool or appliance to search around and locate the GFI device in order to reset the circuit.

Another disadvantage of all these devices lies in the fact that a second person could reset the GFI while the person shocked still is holding the faulty appliance. This would result in repeated shocks until the fault is corrected.

SUMMARY OF THE INVENTION

1. Purposes of the Invention

It is an object of the invention to provide a GFI which eliminates the foregoing drawbacks.

It is another object of the invention to provide a GFI which constitutes relatively few and simple parts and can be made at a low cost.

It is another object of the invention to provide a GFI which, insofar as a member of the public is concerned, does not differ in operation from a conventional prior art GFI.

It is another object of the invention to provide a GFI which can be electronically reset with all the advantages consequent thereon.

It is another object of the invention to provide a GFI which is electronically resettable by a unique circuit that has plural advantages which will become apparent from subsequent objects and a reading of the "PREFERRED EMBODIMENT OF THE INVENTION."

It is another object of the invention to provide a GFI of the character described which employs a magnetic latching relay.

It is another object of the invention to provide a GFI of the character described which employs a magnetic latching relay with a magnetic unlatching capability.

It is another object of the invention to provide a GFI of the character described with employs a magnetic latching relay with a magnetic unlatching capability that is activated by a single pulse.

It is another object of the invention to provide a GFI of the character described in which the magnetic latching relay is very fast acting and minimizes the duration of the shock hazard.

It is another object of the invention to provide a GFI of the character described which employs a magnetic latching relay and eliminates the need for a sensitive tripping mechanism.

It is another object of the invention to provide a GFI of the character described which employs a magnetic latching relay and thereby eliminates complex mechanical linkages and with it the problem of deterioration and age engendered changes of operating characteristics.

It is another object of the invention to provide a GFI of the character described which will afford adequate protection for many years after it is installed.

It is another object of the invention to provide a GFI of the character described which can be set to close and repeatable operational standards.

It is another object of the invention to provide a GFI of the character described which, because it is electronic as to resettability rather than mechanical, can be used to equip remote slave receptacles that are installed physically removed from the GFI itself.

It is another object of the invention to provide a GFI of the character described in which remote slave receptacles can be provided with test and reset buttons as well as pilot lights, the buttons being operable to function in connection with the GFI in the same manner as the buttons physically on the GFI.

It is another object of the invention to provide a GFI of the character described in which the slave receptacles aforementioned can be manufactured at a low cost in comparison to the high cost of the GFI despite the fact that they look the same as the GFI and on a given branch circuit function the same as the GFI.

It is another object of the invention to provide a GFI of the character described which is considerably smaller than GFI's presently on the market, both as to the portable devices and as to the wall receptacles.

It is another object of the invention to provide a GFI of the character described with a reset circuit which is so constructed that should a fault exist it will be impossible to reset the device until the fault is cleared, thus eliminating the possibility of repeated shock hazards to a person that exist with mechanical reset devices.

It is another object of the invention to provide a GFI of the character described which is so constructed that it easily can be determined if the GFI is wired incorrectly.

U.L. requires that should a ground-to-neutral fault exist somewhere in the circuit beyond the GFI, the GFI must trip out. A ground-to-neutral fault creates a dangerous situation in that a fault current through a person to ground could return to the source through the neutral line and, therefore, the differential transformer, the sensor, would not sense the difference in current and, hence, not activate the GFI. It is an object of the present invention to provide a GFI of the character described which is so constructed that if such a dangerous condition should exist the GFI cannot be reset until that condition is corrected.

It is another object of the invention to provide a GFI of the character described that is very fast acting and that takes the GFI circuit off the line at the time that a fault occurs so that the activating means which causes the GFI to be tripped need only be pulsed to interrupt the circuit whereby there is not only a cost saving in the construction of the activating means, but also heat build-up in the activating means is eliminated, since an activating means which must constantly be energized must be operated under continuous duty.

Other objects of the invention in part will be obvious and in part will be pointed out hereinafter.

2. Brief Description of the Invention

The GFI of the present invention includes a circuit interrupter between the line input and a load or a plurality of loads, usually between the line input and the beginning of a branch which may include plural receptacles or plural permanently wired appliances. The circuit interrupter is a switch and currently is mechanical in nature such, for instance, as a circuit breaker. However, the particular type and structure of the circuit interrupter is not a feature of the invention which embraces solid state switches such, for instance, as SCR's. Associated with the circuit interrupter is a remanent magnetic latching means, which is to say, a latching means that will, when rendered effective, hold the circuit interrupter (that normally is closed) in open condition after cut off of the electric power that actuated the latching means. Circuit breakers employing a remanent magnetic latching means, commonly referred to as a remanent magnetic latching relay, are conventional, an example thereof being Type RR Midget Relay Series Remanent Type Magnet Relay manufactured by E. Schrack Elecktrizitaets-A.G. of Vienna, Austria. Conventionally, a remanent magnetic latching relay — and this is true of the remanent magnetic latching relay of the circuit breaker of the present invention — includes a tripping coil which, when actuated, i.e. energized, will release the remanent magnetic latch and permit the circuit breaker to reclose under the influence of a means biasing the circuit breaker contacts to closed condition. The tripping coil usually is the same coil that initially renders the remanent latching means effective, simply being energized for tripping in a polar sense reverse to that in which it was energized to actuate the remanent magnetic latch.

The GFI also includes a sensor that is activated upon the presence of a fault, i.e. a live-line-to-neutral fault or a ground-to-neutral fault. The sensor likewise is conventional and, indeed, can be one similar to those employed in currently available GFI's. The particular structure or mode of operation of the sensor is not a feature of the present invention. Like the circuit interrupter, the sensor may be of any type known to the art, except that with respect to the circuit interrupter the present invention requires the use of an interrupter employing a remanent magnetic latching means and electrically energizeable means to magnetically unlatch the circuit interrupter and permit it to resume its normally closed condition. A usable sensor is one in which a toroidal core of a differential transformer has associated with it a live conductor and a neutral conductor which generate opposed magnetic fields in the core. So long as the current passing through the two conductors is equal, the magnetic fields cancel each other. When the currents are unequal, a net magnetic field ensues. The core also has a sensing winding which responds to the aforesaid net magnetic field to generate an electric signal. The signal is weak, too weak to efficiently and reliably energize a magnetic latching means. Therefore, as with conventional GFI's, an amplifier is provided to amplify the signal to the extent necessary to close a normally open switch, preferably an electronic switch such as an SCR that, in turn, actuates a remanent magnetic latching means that opens the circuit interrupter and holds it open until a signal is applied to the magnetic unlatching means. Furthermore, the GFI, as do most conventional GFI's, includes a rectifier since usually the amplifying circuit and the SCR are DC-powered.

The foregoing elements of the GFI of the present invention are, as indicated, largely conventional except to the extent that the circuit interrupter used in connection with the GFI of this invention necessarily must include a remanent magnetic latching means to hold the normally closed circuit interrupter open, and a magnetic unlatching means which is electrically energized to permit the circuit interrupter to resume its normally closed condition. It also should be mentioned that even though a standard GFI customarily includes a rectifier, usually a bridge rectifier, it is essential to the present invention that the GFI thereof include such a rectifier because, as will be apparent immediately hereinafter, this rectifier, in addition to providing DC energy for the signal amplifying circuit and the SCR, also cooperates with other components soon to be detailed and which, together with its circuitry, represents a feature of this invention. An additional component is a capacitor and a circuit for charging the same from the line current through a rectifier.

The bridge rectifier functions to actuate the remanent magnetic means for opening the circuit interrupter and magnetically maintaining the same in open condition. Since means is in the form of a coil in the load circuit of the SCR, the coil having affiliated therewith a permanently magnetizeable pole piece. The pole piece has an associated movable temporarily magnetizeable armature which is pulled into the pole piece when the latter is magnetized upon the occurrence of a fault and the consequent activation of the SCR and the coil. The movement of the armature opens the circuit interrupter and holds it open because the pole piece remains remanently magnetized when the coil is de-energized and thereby holds the armature against it.

The pole piece is magnetized in a certain sense, since it is activated by a DC current flowing through the SCR upon the occurrence of a fault.

The charged capacitor is in a normally open circuit which when closed for resetting the GFI places the capacitor across the aforesaid coil. The direction of charge of the capacitor, i.e. the sense of its charge, and the manner in which the capacitor is connected across the coil when the circuit is closed is such that when said circuit is closed the capacitor supplies energy of a sufficient amount and of the proper polarity to demagnetize the pole piece which thereupon releases the armature that is urged by a biasing means to a condition in which the interrupter is closed. The aforesaid capacitor demagnetizing circuit is normally open but is closed by manipulating a reset button. When the reset button is held down, i.e. not simply touched and released, the capacitor cannot charge since the capacitor charging circuit includes a current limiting impedance of sufficiently high value to prevent such charging, at least to an extent sufficient to demagnetize the magnetic opening and latching coil. Thus, should a fault occur with the reset button held down, i.e. in the resetting position, the current through the SCR and the latching and opening coil of the circuit interrupter is of a much greater magnitude than that which could be supplied through the aforesaid current limiting impedace which normally charges the reset capacitor.

The GFI may have associated therewith slave circuits, terminating at reset buttons and test buttons at slave receptacles which are in the branch circuit beyond the sensing means whereby the GFI can be reset from any slaved location, thus avoiding the necessity of physically traveling to the GFI itself. Moreover, since in the above described form of the invention, which is the preferred form of the invention, holding down the reset button does not reset the circuit interrupter if the fault still exists, a person actuating the reset button at one location, which may not be the location where the fault exists, cannot create a shock hazard for a person at a different location where the fault does exist.

The invention consists in the feature of construction, combination of elements, arrangement of parts and series of steps which will be exemplified in the device hereinafter described and of which the scope of application will be indicated in the appended claims.

BRIEF DESCRIPTION OF THE DRAWINGS

In the accompanying drawings in which are shown various possible embodiments of the invention.

PREFERRED EMBODIMENT OF THE INVENTION

Figure 1:
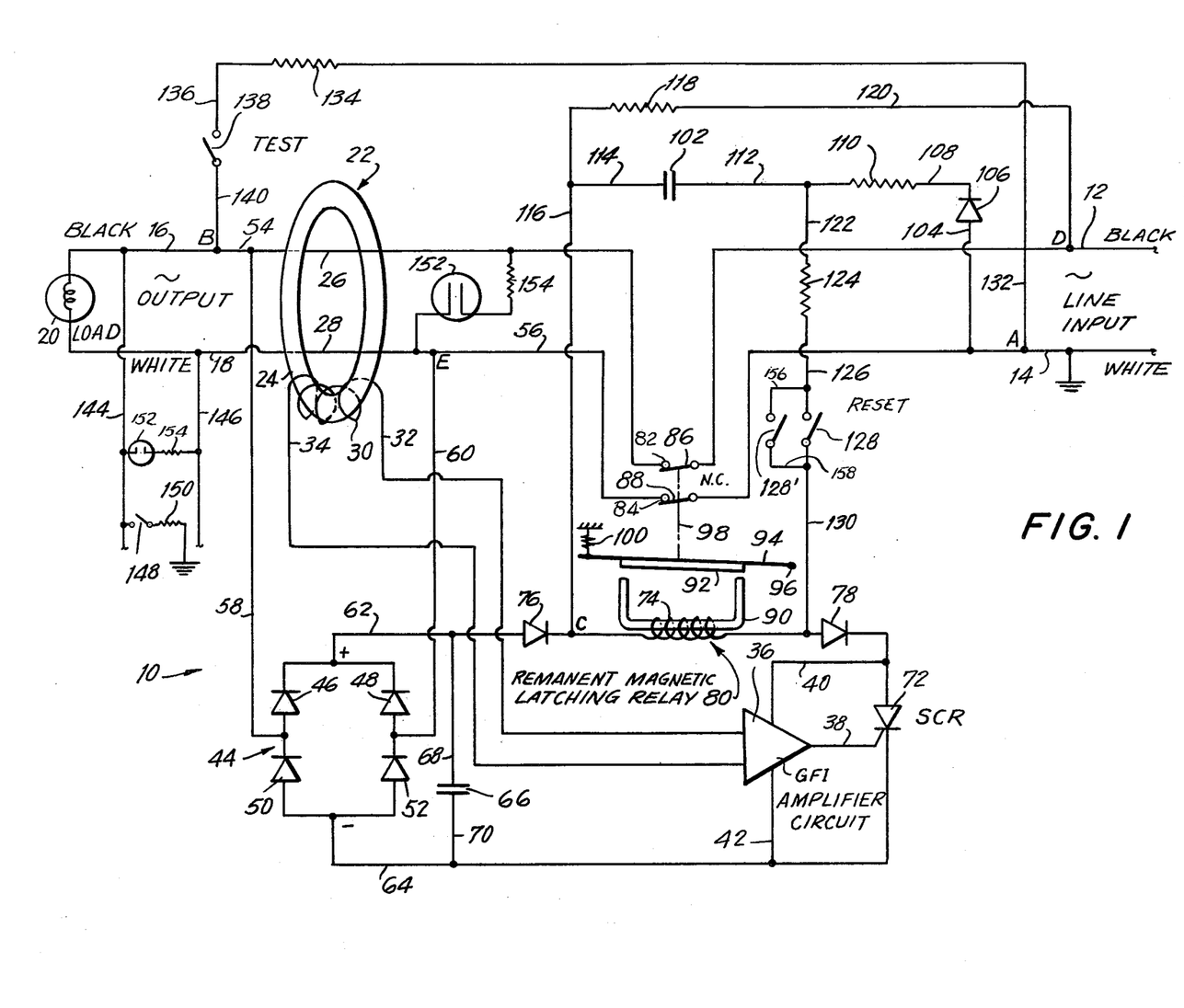
FIG. 1 is a circuit diagram of a preferred form of GFI embodying the present invention.

Referring now to the drawings, and in particular to FIG. 1, the reference numeral 10 denotes the wiring diagram for a GFI embodying the present invention. The input to the GFI is connected to an AC line including a live lead 12 and a neutral lead 14. These leads usually are wire cores covered by black and white insulation sheaths respectively and are, in FIG. 1, labeled by these colors. The output from the GFI is connected by leads 16, 18 to a load 20. The GFI, as do GFI's conventionally, includes a sensor 22 here illustrated as a toroid 24 of magnetizeable material such as soft iron. The toroid is one component of a differential transformer having two windings that constitute simply wires 26, 28 that pass through the toroid in magnetic coupling relationship therewith and are located to generate opposing lines of force in the toroid. Thus, when the current flowing through the lead output line 16 to the load is equal to the current flowing through the lead output line 18 from the load, the magnetic fields in the toroid generated by the wires 26, 28 are equal and opposite so that there is no net magnetic field. The sensor further includes a sensing winding 30 associated with the toroid which winding generates an output across leads 32, 34 when an imbalance exists between the currents flowing in the wires 26, 28. Such an imbalance, of course, is present when the current flowing out of the load is less than the current flowing into the load as when a part of the current is diverted through a ground fault.

The leads 32, 34 connect the sensing output to the input of an amplifier 36 which conveniently is in the form of an integrated circuit. The output from the amplifier appears on a lead 38. An integrated circuit amplifier is employed because it is small, inexpensive and available in large quantities from many companies. Because such an amplifier employs solid state elements, it is customary and usual to power the same with direct current. Power is fed to the amplifier by leads 40, 42.

To supply DC power, the GFI is provided with a rectifier 44 here illustrated as a full wave rectifier including the diodes 46, 48, 50 and 52 arranged in a conventional bridge configuration. The rectifier draws AC power from lines 54, 56 the connections for which subsequently will be described, but which, for the moment it will suffice to understand, carry 110 volts AC. One line 54 is connected to a lead 58 and the other line to a lead 60. The two lines run to the AC input for the rectifier 44. DC power, therefore, appears across the output lines 62, 64. the two output lines are connected to the input power leads to the amplifier 36 so as to energize the same. For a reason subsequently to be mentioned, a capacitor 66 is connected by wires 68, 70 across the output lines 62, 64.

Also connected across the output lines 62, 64 is a normally open switch, preferably a solid state switch such as an SCR 72 having a control terminal to which the output lead 38 of the amplifier 36 is connected. The SCR is an avalanche type device which, when the control terminal thereof has a proper triggering voltage applied thereto, will pass current between its anode and cathode so long as the cathode is positive and the anode is negative. The output of the amplifier circuit is sufficiently high when a ground fault current exists of a predetermined order of magnitude, usually in the order of 5 milliamps., to activate the SCR so that a current will flow through the bridge output lines 62, 64. In this condition the SCR is switched ON. When the SCR is OFF essentially no current flows in the bridge output lines 62, 64. In either of the output lines 62, 64, and as here shown in the output line 62, there is series connected a coil 74. Because this coil will be used to create a magnetic field of a certain sense by virtue of the flow of DC current therethrough, and to ensure a proper direction of flow as well as to protect the rectifier and SCR, diodes 76, 78 may be serially connected in the output line 62 on both sides of the coil 74.

A circuit interrupter in the form of a circuit breaker 80 is interposed between the line input 12/14 and the load 20. Preferably, the circuit breaker is interposed between the input leads 12, 14 and the lines 54, 56 that run through the wires 26, 28 of the sensor 22 to the lead outputs 16, 18. The circuit breaker is a double-pole single-throw device including a pair of stationary contacts 82, 84 each associated with a different blade of a pair of blades 86, 88. The stationary contacts 82, 84 are the input terminals for the lines 54, 56. The blades 86, 88 are the output terminals for the leads 12, 14. When the blades are closed against their associated contacts it will be apparent that the lines 54, 56 are supplied with the line voltage that appears on the line input 12/14. The circuit breaker is normally closed.

The circuit breaker 80 is a remanent magnetically latchable circuit breaker. The same is commercially available and is supplied by several different concerns. One such circuit breaker is a Type RR Midget Relay Series Remanent Type Magnet Relay manufactured by E. Schrack Elecktrizitaets-A.G. of Vienna, Austria. Such a circuit breaker includes a remanent magnetic latch and a tripping means, the tripping means conventionally including a component of the remanent magnetic latch. A typical remanent magnetic latch and tripping means therefor schematically is illustrated in FIG. 1. The remanent magnetic latch includes a pole piece 90 which is made of a material that can be permanently magnetized, that is to say, a material such as normally might be employed to make a permanent magnet. Without limitation, the pole piece can be made of a high carbon steel, a tungsten steel alloy (6% tungsten) or Alnico. The coil 74 is wound about the pole piece. Associated with the pole piece is a magnetizeable armature 92 mounted to move toward and away from a pole or poles of the pole piece as by being supported on a lever 94 that turns about a pivot 96. The armature, although of a magnetizeable nature, is of a material which will not remanently retain its magnetism in the absence of a magnetizing force and in this respect differs from the material of which the pole piece 90 is fashioned, since the latter will retain its magnetism when magnetized, although the remanent magnetism is capable of being removed by the application of a magnetic field of an opposite sense to the magnetic field which magnetized the pole piece in the first instance. The armature is connected to the blades 86, 88 as indicated by the dot-and-dash link 98. A spring such as a helical tension spring 100 is connected between the lever 94 and a stationary object to bias the armature away from the pole piece and, hence, to bias the blades 86, 88 to a position in which they engage the stationary contacts 82, 84; that is to say, the spring 100 constitutes a biasing means that biases the circuit breaker to closed position, and it is for this reason that the circuit breaker previously was described as normally closed.

Although the operation of the circuit breaker 80 will be described in more detail hereinafter, it should be mentioned at this point for appreciation of certain circuit elements subsequently to be described that when a fault current, e.g. a live-wire-to-ground fault current or a ground-to-neutral fault current, of at least a certain magnitude, usually 5 milliamps., is monitored by the sensor 22, a signal is generated in the winding 30 that, when amplified in the amplifier 36, will trigger the SCR 72 to pass current from the bridge 44 through the diodes 76, 78 and the coil 74 in a proper direction and of a sufficient amplitude to magnetize the pole piece 90 strongly enough to pull in the armature 92 and thereby open the circuit breaker. The pole piece remains remanently magnetized and keeps the circuit breaker open unless it is demagnetized to the extent that it can no longer hold the armature 92 against the action of the spring 100, or even to a further extent where it is completely demagnetized. The portion of the circuit next to be described constitutes a means for demagnetizing the pole piece 90, i.e. reducing its remanent magnetization or essentially cancelling its remanent magnetization whereby to permit the spring 100 to restore the circuit breaker to closed condition.

Said means constitutes a capacitor 102 of sufficient capacity to store enough energy to reduce or substantially cancel the remanent magnetization of the pole piece on which the coil 74 is wound. A typical capacity for the capacitor is 0.1 mf. Satisfactory results have been obtained with larger and smaller capacities. For instance, the GFI will operate where the capacitor 102 has a value as low as 0.05 mf and as much as 0.15 mf. As the description continues, it will be seen that the capacitor is charged to full line voltage which is usually in the neighborhood of 110 volts. If desired, the voltage charge can be reduced and satisfactory results have been obtained with a charge of 50 volts at 0.1 mf. Voltage can be reduced by shunting a resistor across said capacitor.

A charging circuit is provided for the capacitor 102. Said circuit includes a head line 104 connecting the neutral lead 14 to a diode 106 that, in turn, is connected by a lead line 108 through a current limiting resistor 110 and a lead line 112 to one side of the capacitor 102. A typical value for the resistor 110 is 220,000 ohms. The other terminal of the capacitor is connected by a lead line 114 to a lead line 116 which extends between a current limiting resistor 118, a typical value for which is 100,000 ohms, and a point C in the connection between the coil 74 and the diode 76. The resistor 118 is connected by a lead line 120 to a point D on the live lead 12.

It will be apparent that the aforesaid circuit will charge the capacitor 102 to the full line potential, the charge being DC applied as a pulsating half wave in a predetermined sense determined by the diode 106. Such a charge is acquired quickly, in a matter of a fraction of a second.

To utilize the charge of the capacitor for the purpose of demagnetizing or reducing the remanent magnetization of the pole piece for the coil 74 to an extent sufficient to permit the spring 100 to pull the armature to circuit-closing condition, a reset circuit is included that constitutes a first branch comprising the connection effected by the lead line 116 from the lead line 114 to point C, as well as a second branch including a lead line 122 extending from the lead line 112 to a current limiting resistor 124, a typical value for which is 680 ohms. The resistor 124 is connected to the junction between the coil 74 and the diode 78 by a lead line 126, a manually operable normally open momentary reset switch 128 and a lead line 130.

Means further is provided for testing the operation of the GFI, as U.L. requires, on a regular basis. Said means constitutes a lead line 132 connecting point A on the input neutral lead 14 through a current limiting resistor 134, a typical value for which is 26,000 ohms, to a lead line 136 that runs to one side of a normally open test momentary switch 138 the other side of which is connected by a lead line 140 to the lead output 16, this being the live full potential line that runs from the sensor 22 to the output including the load 20.

The neutral line 14 is grounded, as shown in the various figures.

To explain the operation of the GFI, reference will be had to FIGS. 1-4.

At this point also it should be mentioned that the slave circuits and the application of the GFI to such circuits will be described after the operation of the GFI itself has been detailed.

The circuit will be considered using as a starting point the condition when there is no fault in existence, i.e. ground to neutral or live wire to ground. At this time the contacts of the circuit breaker 80 are closed. Therefore, full line potential appears on the lead outputs 16, 18, the current flowing from the line and neutral leads 12, 14 through the blades 86, 88 and the contacts 82, 84, through the lines 54, 56, through the wires 26, 28 of the sensor 22 to the lead outputs 16, 18. It will be appreciated that the circuit breaker 80 controls the flow of current from the live and neutral leads 12, 14 to the lead outputs 16, 18, current through the sensor to the output being interrupted when the normally closed circuit breaker assumes an open condition.

Figure 2:
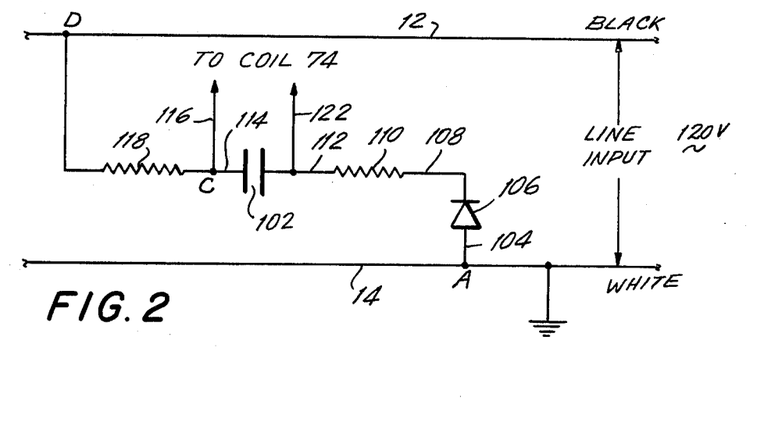
FIG. 2 is a fragment of the circuit shown in FIG. 1, the same including the charging circuit for the triggering capacitor that is employed to unlatch the remanent magnetic latching circuit breaker.

As long as line potential appears on the live and neutral leads 16, 18, the capacitor 102 is charging. For convenience, the charging circuit is illustrated in FIG. 2 with the elements schematically rearranged, but the circuit path being the same as the circuit path illustrated in FIG. 1 and previously described. Charging current for the capacitor 102 flows from point A on the neutral input lead 14 which is on the line side of the circuit breaker 80 to point D on the live lead 12 which likewise is on the line side of the circuit breaker. Hence, the capacitor 102 has a charging potential applied to it regardless of the condition of the circuit breaker. The charging current flows in series through the diode 106, the resistor 110, the charging capacitor and the resistor 118. The presence of the diode 106 ensures that the capacitor is charged in a predetermined sense. The capacitor is charged with a pulsating DC current and will quickly reach its fully charged potential in a fraction of a second. For reasons which will be pointed out subsequently, the capacitor 102 is charged in a sense that when the same discharges through the coil 74 it will generate a magnetic field opposite to that generated in the field by a pulse created when the SCR 72 is momentarily turned on. The charged capacitor remains on line at all times, although, because it is charged by a DC circuit due to the presence of the diode 106, it will not consume any noticeable amount of energy and will not generate heat.

When a fault occurs between the live lead output 16 and ground or between ground and neutral, additional parts of the circuit come into play to cut out the circuit breaker 80 should the fault current exceed 5 milliamps. As this occurs, an imbalance exists in the wires 26, 28 of the sensor, generating a signal in the winding 30 that is amplified in the amplifier 36 to trigger the SCR 72. Triggering the SCR causes current to flow from the bridge through the lead 62, through the diode 76, through the coil 74, and through the diode 78 to the SCR. The current flowing through the coil is sufficiently high to energize the pole piece 90 enough to pull the armature 92 to it and thereby open the circuit breaker 80. This cuts out the branch circuit fed by the lines 54, 56 so that the live lead output 16 no longer carries any potential. This cut out has taken place very rapidly, within a few cycles, because the winding 30 energizes in a tiny fraction of a second, the amplifier operates in a tiny fraction of a second, the SCR turns on in a tiny fraction of a second, the coil 74 energizes in a tiny fraction of a second, and there is the same minute time lag in the pulling down of the armature 92 and consequent opening of the circuit breaker 80. The action is so fast and at such a low level of fault current that a person who is touching a live part of the branch circuit is not exposed to any dangerous shock hazard. Because a magnetic latching circuit breaker is used, the GFI does not have associated with it any of the disadvantages of tripping mechanisms including many mechanical parts. Indeed, the armature 92 may be of the floating type, simply being guided for movement toward and away from the pole piece without the necessity of a pivot point 96 which only has been illustrated as a simple means to guide the movement of the armature 92 toward and away from the pole piece.

When the circuit breaker opens, the bridge 44 is de-energized because it takes its power from the load side of the GFI which is cut out at this time. The circuit breaker opens so rapidly that there may not even be sufficient time to complete the necessary flow of current through the coil 74 to energize the pole piece 90 sufficiently to pull down the armature 92 against the spring 100. To ensure that this flow of current continues for a long enough time to pull down the armature to a circuit breaker opening position, the capacitor 66 is provided, this supplying additional energy after the circuit breaker contacts open. After the circuit breaker opens and the capacitor 66 is discharged, no more current flows through the coil 74. Nevertheless, the armature 92 remains attracted to the pole piece 90 in its contact opening position. Thus, the circuit breaker is magnetically latched in open condition by virtue of the remanent magnetism of the pole piece 90 since the same at this moment is permanently magnetized, at least for a temporary time; that is to say, the magnetism will remain in the absence of the application of any demagnetizing field.

Figure 4:
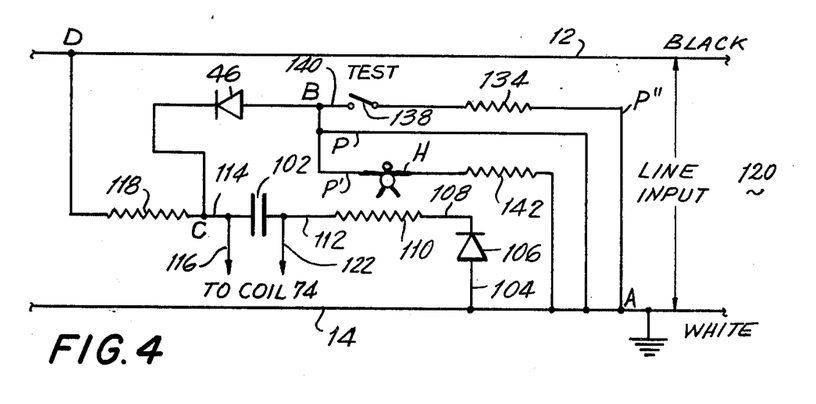
FIG. 4 is a view similar to FIG. 2 but further illustrating the test circuit, a live-wire-to-ground fault and a live-wire-to-ground fault through a person.

In FIG. 4 there are shown various grounding paths, with the portions of the circuit that actuate the circuit breaker being omitted.

Disregarding the test portion of the circuit shown in FIG. 4, and concentrating only on the presence of the faulty circuit, the same is illustrated in this figure by two alternate paths P and P'. The path P' denotes a ground fault through a human H. The human presents a certain resistance between the live lead output and ground which resistance is lower than that of the resistor 134 and, therefore, such that the presence of the alternate path P draws at least 5 milliamps. This, as illustrated in the circuit, is a design parameter arbitrarily selected pursuant to U.L. requirements and is not to be considered as a limitation upon the invention. In other words, the maximum fault current is of a magnitude such as to be acceptable in the geographical area where the GFI is to be installed. The path P' is shown as including a resistor 142 which is the lumped resistor presented by an accidental grounding path from the live lead output. The resistance value of this resistor 142 will become a fault if more than 5 milliamps pass through it.

When either of the paths P or P' has a resistance value such as to engender a flow of at least 5 milliamps., the circuit breaker 80 will open in the manner described above.

In FIG. 4 there also is shown another path P" which is the test path and which constitutes the lead 140, the test switch 138, the lead line 136, the resistor 134 and the lead 132. When the test switch is closed it will simulate a fault of about 5 milliamps., enough to actuate the GFI by energization of the winding 30 in the manner and to the extent aforesaid.

The test path is used, that is to say, the test switch 138 is closed at intervals as required by U.L. When closed (referring to FIGS. 1 and 4), the equivalent of a fault current, i.e. a current of about 5 milliamps., flows from point B through the resistor 134 to the neutral lead 14 and also to ground. This leads to an imbalance in the sensor 22 with the consequent energization of the SCR 72 and magnetization of the coil 74 to open the blades 86, 88 whereby flow of current from the line input to the output is interrupted at the circuit breaker 80; that is to say, this will occur if all the components of the GFI are in good working order.

After the circuit breaker is open and the pole piece 90 is remanently magnetized, the GFI must be reset, assuming that the fault has been removed. As a matter of practicality, what occurs is that the person using a tool or appliance on the lead outputs 16, 18 sees that the tool or appliance is not functioning. The reason for it not functioning may be that a live part, whether the part was supposed to be live or has accidentally become live, has become grounded directly or through a person so that a fault has been engendered, even though the operator may not be aware of it, because before any appreciable current has started to flow to ground, the circuit breaker will have opened to prevent a dangerous shock hazard, so that the non-functioning of the tool or appliance may not be attributed by the user to a ground fault. If he notices the shock, even though it is minor, he will reset the GFI. If he does not notice the shock, he may go back to the fuse or circuit breaker for the branch circuit and check these and, if he finds that they are in working order, he will assume that the GFI has to be reset.

The circuit breaker is reset by closing the reset switch 128. This discharges the capacitor 102 across the coil 74 in a direction opposite to that in which current was passed through the coil 74 between the bridge and the SCR. Therefore, the pole piece 90, which before resetting was remanently magnetized in a certain direction by current previously flowing through the SCR, loses its magnetism when the current from the capacitor 102 flows through the coil 74. The loss in magnetism is sufficient for the pole piece 90 no longer to be able to hold the armature 92 against the bias of the spring 100, so that the circuit breaker recloses.

The previous description has assumed that the fault was removed. In a present-day GFI the resetting will take place even if the fault still is present, and thereby subject a person who may have been the current pathway for the fault to a second shock. This obviously is highly undesirable. The present GFI, however, avoids such problem because the fault (see FIG. 4) provides a parallel path to neutral for the capacitor 102, this path being parallel to the path to neutral from said capacitor through the resistor 110. Hence, so long as the fault exists, the presence of this alternate shunting path through the fault prevents the capacitor from being charged up to full line potential, and specifically, to store enough energy to demagnetize the pole piece sufficiently to permit the circuit interrupter to reclose its contacts. Therefore, so long as the ground fault exists, the capacitor 102 cannot recharge enough for resetting. Hence, when the GFI is opened and the fault remains, it is not possible to reset the GFI and, therefore, it is not possible to resubject a person or path which constitutes a ground fault to a freshly applied line voltage. Such feature of the instant GFI is a particularly valuable one, providing, as it does, the function of prevention of repeated shock hazards when a ground fault exists, when the GFI trips and when the GFI is reset after tripping.

Figure 3:
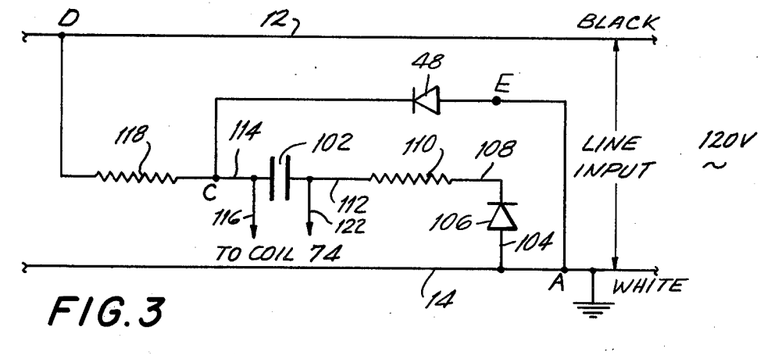
FIG. 3 is a view similar to FIG. 2 but further illustrating an additional portion of the circuit and the presence of a ground-to-neutral fault.

In FIG. 3 there are shown those portions of the circuit which are operative when there is a ground-to-neutral fault, this being between the points A and E. (E is at the neutral line 56 on the output side of the circuit breaker 80, and A is at the neutral lead 14 on the input side of the circuit breaker 80.) It will be seen in FIG. 3 that the shunt path through the diode 48 bleeds off part of the current which otherwise would be charging the capacitor 102 to full line potential, as does the shunt path through the diode 46 in FIG. 4 above described. Hence, where a ground-to-neutral fault exists, the GFI cannot be reset because the capacitor 102 never charges to a sufficient potential to store enough energy to drop the remanent magnetism of the pole piece 90 to a point where it will release the armature 92 and permit the spring 100 to reclose the circuit breaker. Indeed, the draining path through the diode 48 in FIG. 3 is of such a low order of resistance that the capacitor 102 will not charge at all, so that the GFI cannot be reset. Elimination of this ground-to-neutral fault will enable the said capacitor to fully charge so that the circuit breaker can be reset.

Due to the use of electronic circuitry for triggering the cut out of the GFI and for triggering the reset thereof, the GFI of the present invention is uniquely adaptable for use in connection with slave units. Referring again to FIG. 1, the lead lines 144, 146 represent power connections which are taken from the lead outputs 116 and 118 to various other loads such as, for instance, as receptacles which are in parallel with the load 20. Heretofore, with conventional GFI's, if a fault existed anywhere in the branch circuit after the sensor 22, it would trip the GFI and, if there were more than one load, e.g. receptacles, the person using a specific receptacle would have to search for the GFI that controlled the entire branch, in other words, find the GFI and then press the reset button. This not only had the disadvantage that it was time consuming and annoying, but it also meant that if there were two people working on the branch circuit on different appliances, the one at the GFI, not knowing that somebody was working on a different appliance on the same branch circuit and upon seeing that power had failed him, might push the reset button so that if a ground fault still existed at a slave receptacle, the person at the ground fault might get a second or even subsequent shocks. However, by use of the present invention, it is possible to reset the GFI from remote points, i.e. at slave receptacles, without having to look about for the GFI at the head of the branch line.

It will be observed that in the lead lines 144, 146 there is shown a second normally open momentary test switch 148 connected in series with a resistor 150 of the order of magnitude of the resistor 134 to ground. Closing of the switch 148 will testingly trip the circuit breaker 80, just as closing of the switch 138 performed the same function. There will be one such test switch 148 at each slave receptacle, and each slave receptacle has such a test switch associated with it.

There also is associated with each of the appliances, receptacle, or receptacles or loads an indicator light such as a neon bulb 152, or an LED with a diode, in series with a resistor 154, the two being connected in series across the line, i.e. branch circuit, beyond the circuit breaker. This will enable a person at any given load, appliance or tool to know whether the branch circuit is live. When the light is extinguished he will know that the branch circuit is dead and probably first push a reset button to ascertain whether this will reactivate the branch circuit, making certain before he does so that, if he is touching a part of the tool, appliance, etc., he will remove himself from contact therewith.

Leads 156, 158 extend from opposite sides of the reset switch for the main GFI 10 to all slave receptacles, etc. where they are provided with normally open momentary reset switches 128' in parallel with the switch 128 so that the GFI can be reset at any slave locations.

It will be appreciated that with the GFI 10 a much greater degree of safety is obtainable than with current GFI's in that repeated shocks to a person holding a live tool or appliance are not possible until the fault is corrected. It also will be appreciated that with the GFI 10 it is possible to have slave units that can be sold at a small fraction of the cost of the master GFI. The slave units will have the same face construction and main housing as the master unit and each would incorporate a test switch, a reset switch and an indicator illuminatable device.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A GFI protected circuit comprising:
  A. an AC line input including a live lead and a neutral lead,
  B. a branch circuit including a live lead and a neutral lead,
  C. a circuit interrupter between the line input and the branch circuit, D. a sensor which, responsive to a fault of at least a predetermined magnitude, will generate an electric signal,
E. a rectifier energized from a live lead and a neutral lead and having a DC output,
F. an amplifier powered by the rectifier and having an output, the electric signal being fed to the amplifier,
G. a normally open switch having a control terminal connected to the amplifier output, the switch closing upon application to the control terminal of an amplifier output corresponding to a fault of at least said predetermined magnitude and thereupon supplying a DC current of a predetermined polarity,
H. said circuit interrupter including a remanent magnetic latching means and means biasing the interrupter closed,
I. said latching means being actuated by flow of current therethrough upon closure of the switch, said latching means remaining closed by remanent magnetization upon opening of the circuit interrupter and consequent deactuation of the latching means and opening of the switch,
J. an electric energy storing means,
K. means to charge said electric energy storing means in a predetermined sense,
L. releasing means to reduce the remanent magnetization of the latching means and, when actuated, to disable the latching means and permit the biasing means to close the circuit interrupter, and
M. a normally open reset switch that, upon closure, discharges the energy storing means to the releasing means in a sense to reduce the remanent magnetization of the latching means.

2. A circuit as set forth in claim 1 wherein at least one drain branch is connected to the energy storing means through the fault to prevent accumulation of sufficient energy to actuate the tripping means when the reset means is closed while the fault exists.

3. A circuit as set forth in claim 2 wherein the normally open switch is connected to the rectifier output and wherein the drain branch includes the rectifier.

4. A circuit as set forth in claim 2 wherein a rectifier controls charging of the electric energy storing means in a predetermined sense from the AC line and wherein the drain branch includes the last-named rectifier.

5. A circuit as set forth in claim 1 wherein the electric energy storing means is a capacitor.

6. A circuit as set forth in claim 1 wherein the latching means and the tripping means include a common coil magnetically coupled to a permanently magnetizeable pole piece which coil is reversely actuated for latching and tripping.

7. A circuit as set forth in claim 1 wherein the remanent latching means constitutes a pole piece and a coil, the pole piece being magnetized upon energization of the coil from the normally open switch when the latter is closed and remaining remanently magnetized to hold the latching means closed, the energy storing means reversely energizing the pole piece through the coil to reduce the remanent magnetization.

8. A circuit as set forth in claim 1 wherein at least one slave device is connected to the branch circuit beyond the sensor.

9. A circuit as set forth in claim 8 wherein the slave device includes a normally open reset switch connected in parallel to the first-named reset switch.

10. A circuit as set forth in claim 9 wherein a normally open testing switch and a testing switch circuit are connected in series between the live lead of the branch circuit and ground.

11. A circuit as set forth in claim 10 wherein a normally open testing switch and a testing switch circuit are connected in series between the live lead of the branch circuit and ground at the slave appliance.

12. A circuit as set forth in claim 9 wherein a pilot light is connected between the live lead and the neutral lead of the branch circuit physically adjacent the sensor and another pilot light is similarly connected and is physically associated with the slave device.

13. A circuit as set forth in claim 1 wherein means is included to restrict the current supplied by the charging means to the electric energy storing means such that the energy stored in the electric energy storing means is insufficient to actuate the releasing means as long as the reset switch is held closed.

14. A circuit as set forth in claim 1 wherein means is included to restrict the current supplied by the charging means to the electric energy storing means such that the energy stored in the electric energy storing means is insufficient to actuate the releasing means as long as the fault exists.

15. A circuit as set forth in claim 1 wherein means is included to restrict the current supplied by the charging means to the electric energy storing means such that the energy stored in the electric energy storing means is in sufficient to actuate the releasing means as long as the reset switch is held closed and the fault exists.

16. A circuit as set forth in claim 1 wherein the reset switch, upon closure thereof, closes a circuit shunting the electric energy storing means across the releasing means and wherein the charging means includes an impedance to prevent the electric energy storing means from being charged sufficiently to actuate the releasing means as long as the reset switch is closed.

* * * * *